F. J. B. KNIBIEHLER.
PLANT FOR THE TREATMENT OF FABRIC PIECES.
APPLICATION FILED DEC. 5, 1919.

1,365,175.

Patented Jan. 11, 1921.
3 SHEETS—SHEET 1.

Inventor.
Friedrich J. B. Knibiehler
By [signature]
Atty.

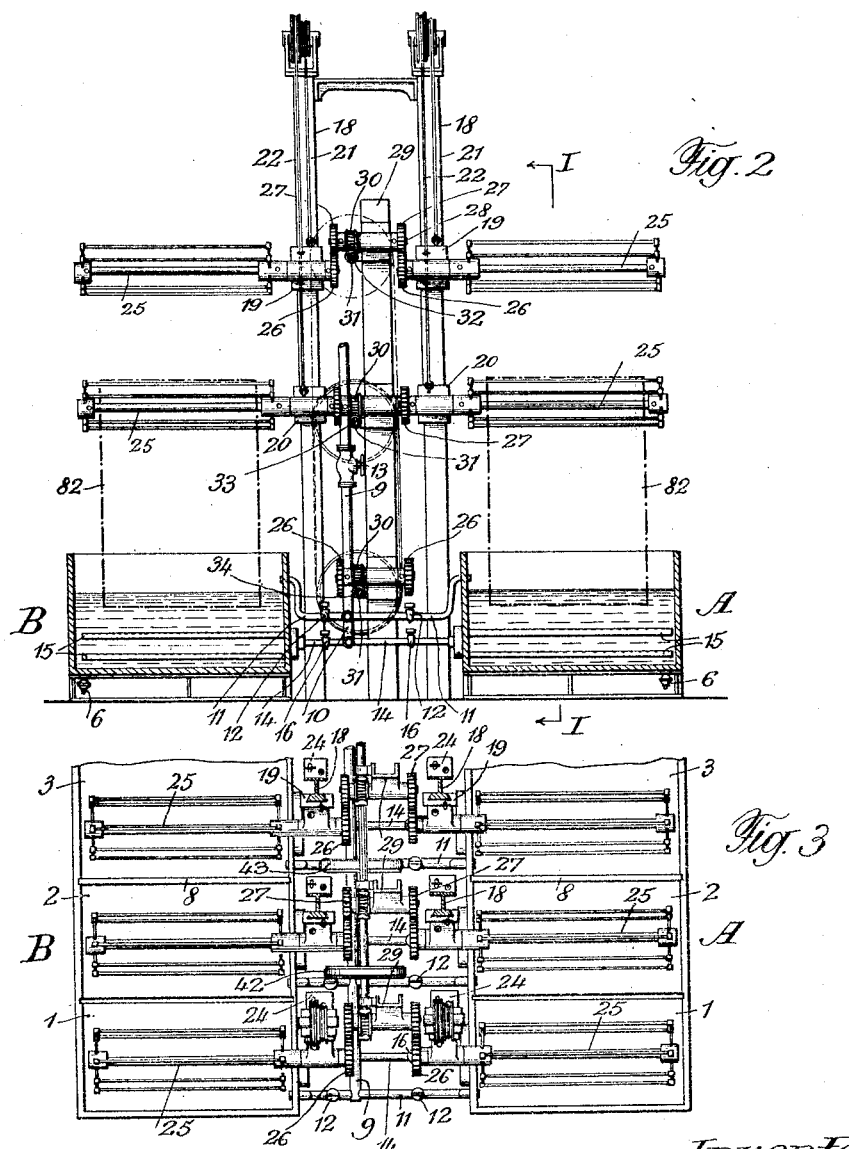

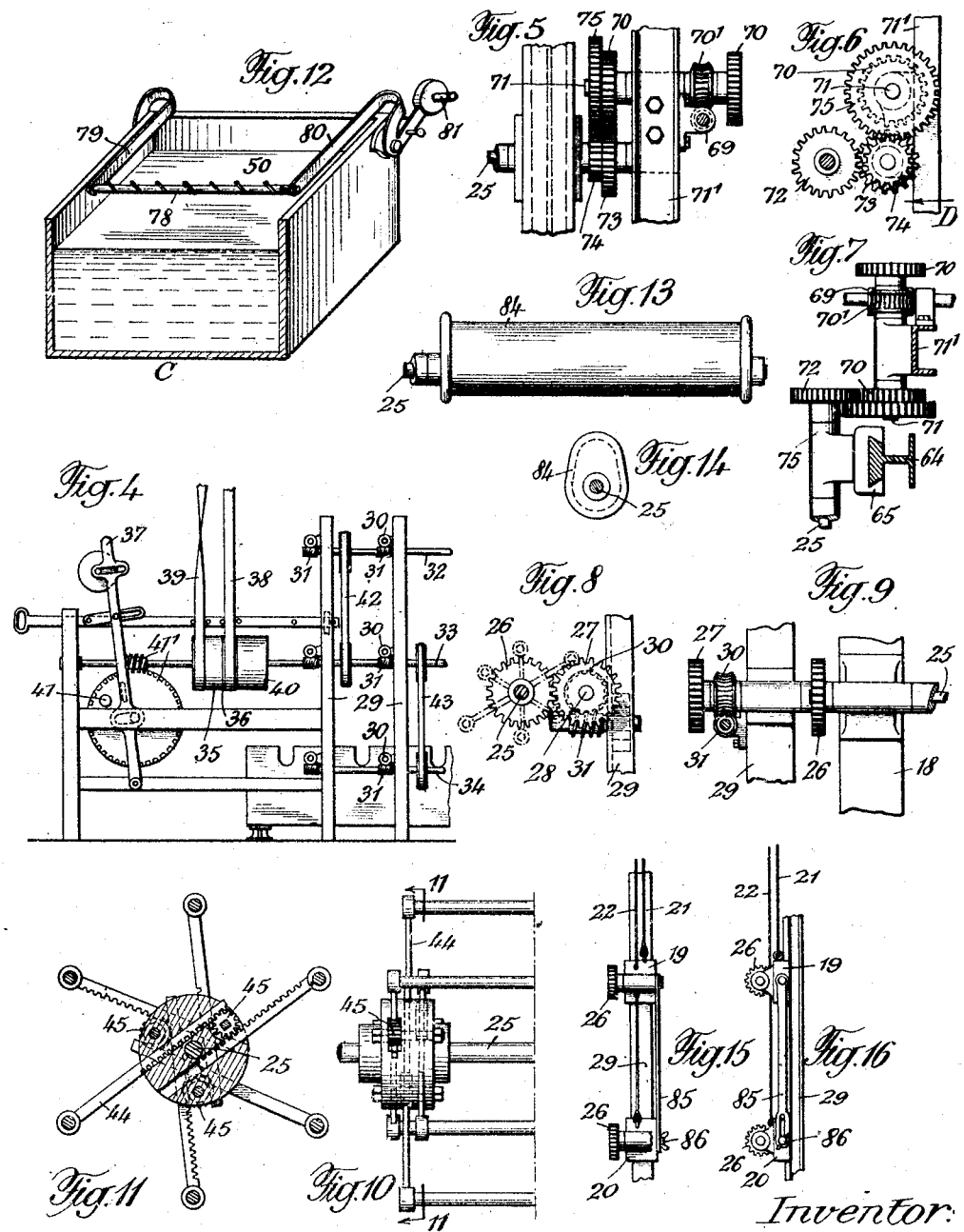

UNITED STATES PATENT OFFICE.

FRIEDRICH JOHANN BAPTIST KNIBIEHLER, OF WETTINGEN, AARGAU, SWITZERLAND.

PLANT FOR THE TREATMENT OF FABRIC PIECES.

1,365,175.   Specification of Letters Patent.   Patented Jan. 11, 1921.

Application filed December 5, 1919. Serial No. 342,840.

*To all whom it may concern:*

Be it known that I, FRIEDRICH JOHANN BAPTIST KNIBIEHLER, a citizen of the Republic of Switzerland, residing at Wettingen, Aargau, Switzerland, have invented certain new and useful Improvements in Plants for the Treatment of Fabric Pieces; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

The present invention relates to a plant in which, in connection with each compartment of a number of compartments forming at least one group and being completely separable from each other, conduits for supplying liquids and members for controlling the flow therein are arranged in such a way that the liquid, which is just required for the treatment of the silk in a certain compartment, may be supplied to every compartment at any moment. Furthermore, in connection with every one of said compartments two adjustable reels are provided, said reels are rotated by a common driving shaft and arranged to be disengaged separately.

A plant in accordance with the present invention may comprise in addition to the group of compartments, the chambers of which may be entirely separable from each other, at least one more group of compartments, which communicate permanently with each other, and the combination of every one of said compartments with a reel, arranged to be disengaged separately.

The accompanying drawings illustrate by way of example a convenient mode of carrying into effect a plant according to this invention. In the drawings:

Fig. 2 is a section on the line II—II of Fig. 1.

Fig. 3 is a horizontal section on the line III—III of Fig. 1.

Fig. 4 shows on a smaller scale a front view of the driving mechanism of the plant.

Fig. 5 shows in a side view, seen in the direction of the arrow D of Fig. 6, the driving mechanism of a reel appertaining to that group of compartments which communicate permanently with each other.

Fig. 6 is a corresponding front view and Fig. 7 is a plan of Fig. 6.

Figs. 8 and 9 show in a front and side view respectively the driving mechanism of those groups the compartments of which may be separated from each other.

Fig. 10 is a side view of part of a reel and Fig. 11 is a section on line 11—11 of Fig. 10.

Fig. 12 is an outside view of a detail.

Figs. 13 and 14 show in a side and front view respectively a reel in the shape of an eccentric roll.

Figs. 15 and 16 show in a side and front view respectively alternations of details.

Figure 1:
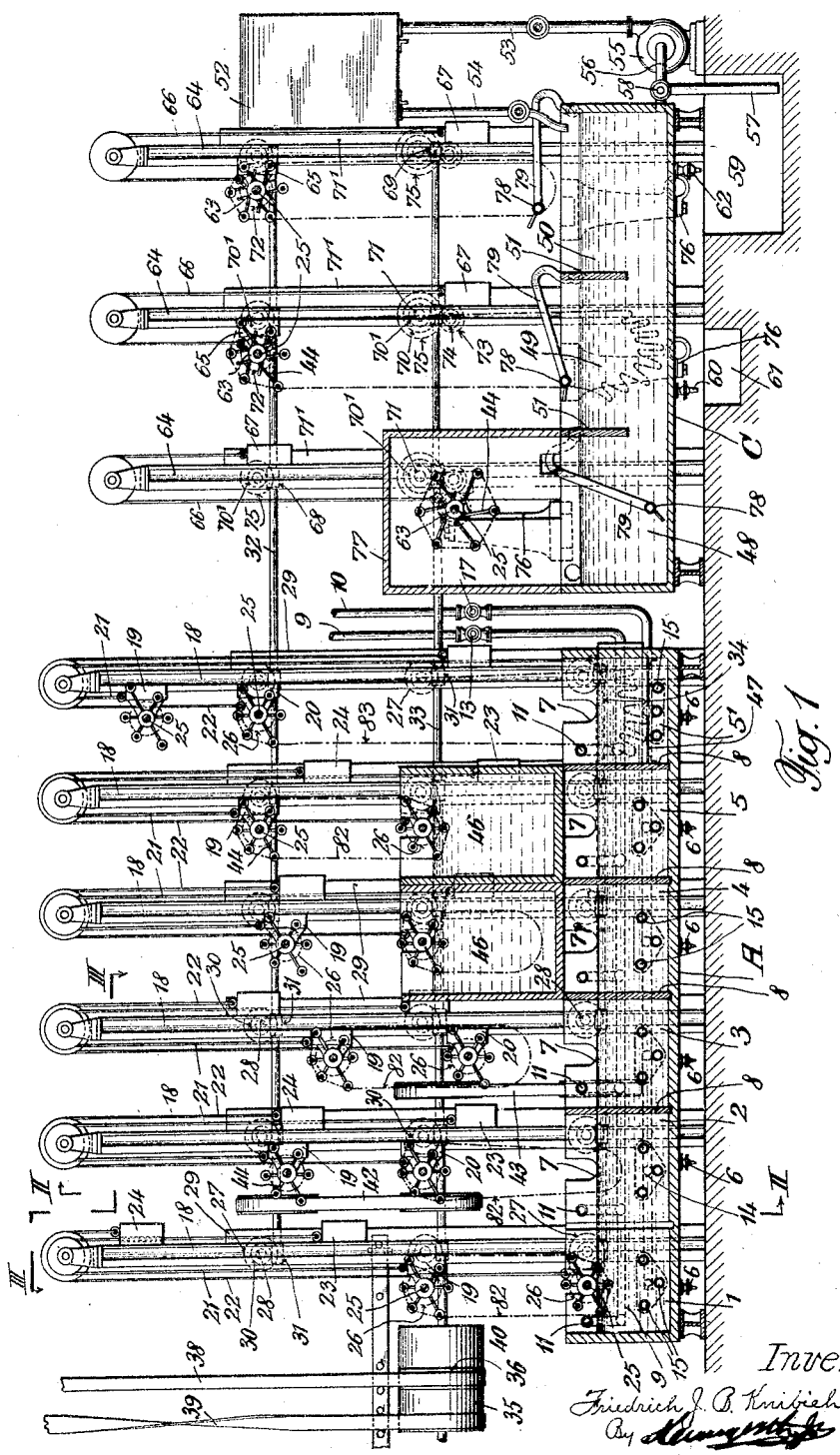
Figure 1 is a vertical longitudinal section on the line I—I of Fig. 2 through the plant.

The plant illustrated in the above figures comprises two groups A and B (Figs. 2, 3) of compartments 1, 2, 3, 4, 5, $5^1$, each of which is provided with an emptying cock 6 and an overflow 7 (Fig. 1). These compartments may be separated from each other by means of removable partitions 8 or may be arranged to communicate with each other when removing the partitions 8. 9 denotes a conduit for supplying a low grade fixing liquid and 10 a conduit supplying fresh water. The conduit 9 is connected up to horizontal pipes 11, which extend into the upper part of the compartments 1, 2, 3, 4, 5, $5^1$. The discharge of the liquid from the pipes 11 into each of the compartments 1, 2, 3, 4, 5, $5^1$ may be checked by means of cocks 12 (Figs. 2, 3), a valve 13 being provided to stop the discharge of fixing liquid to the two groups of compartments A and B. The conduit 10 is subdivided into branch-pipes 14, each of which branches off again into a number of groups of spraying pipes 15. One such group of spraying-pipes 15 is arranged in the lower section of compartment 1 or 2, 3, 4, 5 respectively. The spraying pipes 15 may either be fixed at different heights (compartment 1, 2, 3, 4, 5) or at the same height (compartment $5^1$). Each group of spraying pipes 15 which extends into a compartment is fitted with a common adjustable cock 16 (Fig. 2). A cock 17 (Fig. 1) provides for shutting off any supply of fresh water to the groups A and B.

Two columns 18 are provided between each two of opposite compartments 1, 2, 3, 4, 5, $5^1$ of the two groups A and B. Two slide-blocks 19, 20, which are adjustable in a vertical direction, are mounted on each of the columns 18. Each slide-block 19 and 20 respectively is connected by means of a cable 21 and 22 respectively to a counter-weight 23 and 24 respectively. Reel-shafts 25 are journaled in these slide-blocks 19 and 20 respectively. In connection with each compartment 1, 2, 3, 4, 5, of the two groups A and B two reel-shafts 25 are provided and arranged in pairs and vertically one above another. Each reel-shaft 25 is fitted with a toothed wheel 26, which may be brought into action with any one of three toothed wheels 27, arranged vertically above each other. Each toothed wheel 27 is rigidly connected to a shaft 28 (see also Figs. 8, 9), three of which shafts are arranged vertically above each other. The three shafts 28 which are vertically above each other are carried on a common girder 29 (Figs. 2, 3, 9). The girders 29 are disposed midway between the compartments 1, 1 or 2, 2; 3, 3; 4, 4; 5, 5; $5^1$, $5^1$ respectively of the groups A and B (see Fig. 3). Each of the shafts 28 is provided with two toothed wheels 27, which are arranged on either side of the girder 29, supporting said shafts. Further a worm wheel 30 is rigidly connected to each shaft 28, which may be brought into action with a worm 31 of a driving shaft 32, or 33, 34 respectively. Each of the shafts 32, 33, 34, which are arranged parallel to each other and vertical above each other, comprises six worms 31. The shafts 32, 33, 34 receive their drive from a belt pulley 36 (Fig. 4), fixed to the shaft 33, on which pulley either an open belt 38 or a crossed belt 39 is working, according to the position of a lever 37, which may be either actuated by hand or by a pin 41 of a worm gear $41^1$. On being disengaged, belts 38, 39 run on loose pulleys 35 and 40. The rotary motion of shaft 33 is transmitted by means of a belt drive 42 to the shaft 32 and by means of a belt drive 43 to the shaft 34.

The reels carried on the shafts 25 are provided with adjustable arms 44, which, as is shown by way of example in Figs. 10 and 14 and in Fig. 1 in connection with the compartment C, are fitted with a rack and pinion device; these arms 44 may be adjusted in pairs in a mainly radial direction with reference to reel shaft 25 by means of toothed wheel 45 actuated by hand (shown only in Figs. 10 and 11), so that the reels may be arranged to rotate centrically or eccentrically. The reels may be engaged or disengaged singly or brought into or out of action with one of the worms 31 of the shafts 32, 33 or 33, 34 by being lifted or lowered. 46 (Fig. 1) denotes auxiliary compartments which serve to receive liquids, employed for certain treatment of silk, and which are adapted to be placed on the top of one of the compartments 1, 2, 3, 4, 5 or $5^1$.

The adjustable arrangement of the reel arms 44 enables the skein to be guided at any length or height and to be kept stretched or slackened on passing through the compartments 1, 2, 3, 4, 5, $5^1$ or through the liquid contained by the auxiliary compartments 46. As shown in connection with compartment $5^1$, a sieve 47 (Fig. 1) may be provided above the spraying pipes 15 in order to prevent the fabric from being lifted by the liquid discharged from the pipes 15.

Besides the two groups A and B of compartments 1, 2, 3, 4, 5, $5^1$ the plant shown comprises two additional groups C (only one of them is shown in the figures), of compartments 48, 49, 50. These compartments 48, 49, 50 are partly separated from each other by means of partitions 51, which extend only to half the depth of the compartments. All these compartments 48, 49, 50 of one group C communicate with each other through their lower part. 52 (Fig. 1) denotes a reservoir, arranged on one side of and above each group C, and connected to a pump 55 by means of pipes 53. 54 denotes a conduit connected to the reservoir 52 with its lower end above the compartment 50. A three-way cock 58 inserted into a conduit 56 enables to connect either the pump 55 to the compartment 50 or to a pipe 57, extending into a sump 59 or to establish a connection between the compartment 50 and the pipe 57. A cock 60 provides for emptying the liquid contained in the compartments 48, 49, 50 into a channel 61, while a cock 62 enables the liquid contained in the compartments 48, 49, 50 to flow directly into the sump 59, evading the pipes 56 and 57.

This arrangement renders it possible, to pump for instance a liquid used for dying or fresh water from the sump 59 into the reservoir 52 while the compartments 48, 49, 50 are containing at the same time a fixing solution. After the fixing solution has flowed off from the compartments 48, 49, 50 into the sump 59 provision can be made by opening the cock inserted in the conduit 54 for the liquid contained in the reservoir 52 to flow into the compartments 48, 49, 50. On the other hand the three-way cock 58 may be set in such a way that the pump 55 lifts the liquid directly from the compartments 48, 49, 50 into the reservoir 52.

In combination with each of the compartments 48, 49, 50 a single reel is provided, which is carried on a slide-block 65, the latter being adjustable on a vertical column. Each slide-block 65 is connected by means of a cable 66 to a counter-weight 67. The reels 63 may, in two different heights, be rotated by means of worms 68 and 69 respectively of the shafts 32 and 33, each of these worms being in action with a worm-wheel 70¹ (Fig. 5). Each worm-wheel 70¹ is rigidly connected to a shaft 71 (Figs. 5–7), which latter carries two toothed wheels 70 (Figs. 5–7) also fixed on said shaft. A toothed-wheel 72 of one of the reel-shafts may be brought into mesh with each of the toothed wheels 70. The shafts 71 arranged in pairs vertically one above another are supported by girders 71¹. The reels 63 may be disengaged singly by adjusting them in a vertical direction. In a third position between the two positions previously referred to, the reels 63 may be rotated with a comparatively high speed for the purpose of subjecting the fabrics on the reel to a preliminary centrifugal action, by bringing the wheel 72 of said reel 63 into mesh with a toothed wheel 73 which receives its drive through a gear 74, 75 from the shaft 71. When such a preliminary imparting of centrifugal action has to be carried out reels 63 are supported by hinged arms 76 (Fig. 1) which are arranged on opposite walls of the compartments 48, 49, 50. 77 denotes a removable case, which is placed above one of the compartments of group C when such a preliminary imparting of centrifugal action has to be carried out, after the reels 63 have been brought into that position in which the reel of compartment 48 is shown in Fig. 1. A guide roller 78 (see also Fig. 12) is provided in combination with each compartment of group C. These rollers 78 are intended to prevent the skeins or transversely folded up or hose like skeins on being passed through the liquid of the compartments 48, 49, 50, from being raised against the surface by the air which is carried along with the fabrics during the process. Each roller 78 is supported by two arms 79, 80 (Fig. 12) which are pivotally mounted in the compartment 48, or 49, 50 respectively. Of these two arms, arm 80 may be turned by means of a handle 81 in order to fix the roller 78 at different heights, for the purpose of putting the fabrics on or off the arms 79, 80 and thereby on or off the reels.

A plant as described above may be worked in the following manner:

For the purpose of washing skeins 82, in a comparatively tightly stretched or in a slack condition in the compartments 1, 2 of the groups A, B, these compartments are made to communicate with each other by removing the partition 8 and the reels, arranged above the compartments 1, 2 two of which belong to each compartment, are brought into the position shown in Fig. 1 by means of adjusting the slide-blocks 19, 20, in which position both reels of the compartment 1 are driven by worms 31 of the shaft 33 and 34 respectively, while the upper reel of compartment 2 is out of action and the lower one is driven by the worm 31 of the shaft 33. After that, the valve 17 of the fresh water conduit and the valve 16, which are provided in combination with the spraying pipes 15 of the compartments 1, 2 of the group A, B, are opened, so that the compartments start to fill with water. Then the skeins 82 to be washed are put on to the eccentric reels of compartment 1 or on to the lower reel of compartment 2 respectively. The skeins 82 on being rotated by the rotary motion imparted to the reels, are washed by means of the water jets of the spraying pipes 15. The arrangement of the spraying pipes 15 in the lower part of the compartment and not above the level of the liquid contained therein, as is the case with the heretofore known washing machines, insures that all parts of the skeins 82 are equally washed and no water is lost and any carding or shifting of the threads is prevented. With this arrangement of the pipes 15 a strong current of water in the compartments is reached without the silk threads being directly acted upon by the water jets. The unused liquid flows off the compartments by means of over flows 7. During the same time that the skeins 82 are being washed in the compartments 1, 2, compartment 3 may for instance be filled with water, whereon the fabrics in this compartment 3 may be treated in the same manner with fresh water as has been described with relation to the compartments 1 and 2. After the time elapsed for putting the skeins on the reels of compartment 3 and for setting the reels into motion, the skeins 82 which have been previously brought onto the reels of compartment 1 or 2 may already have been sufficiently washed and may be taken off.

If a skein running over two reels has to be taken off, both of said reels are lifted in order to stop their rotary motion, i. e. they are brought into a position which corresponds to that shown in Fig. 1 for the reels above compartment 3. In this position neither to the upper nor to the lower of the two reels, placed vertically one above another, is imparted a rotary motion.

After a skein 82 has been treated with the fresh water contained in compartments 1, 2 or with a weak fixing solution, contained in compartment 3, this skein which is passing over the lower or over both reels, placed vertically one above another, may be subjected to further treatment, for instance to brightening without it being necessary to remove it from the one or both of the reels, if another compartment 46 is placed above the previous compartment. In case the skein has only to be passed over the lower reel, the two reels placed one above another will then be brought into the position which the two reels, shown in Fig. 1 above the compartment 4, occupy. In this position there is no rotary motion imparted to the upper reel, while the lower reel is driven by the worm 31 of the shaft 34. In case the skein 82, which has to be treated in a liquid contained in a compartment 46, has to be passed over two reels, placed vertically one above another, the latter will be brought into the position, which occupy the two reels above compartment 5 in Fig. 1. In this position both reels are rotated, the upper one by the shaft 32 and the lower one by the shaft 33.

If, for example, a transversely folded skein 83 (Fig. 1, compartment 5¹) has to be passed in a slack manner through the liquid contained in one of the compartments of group A, B, the reels above said compartment are brought into the position which the reels above compartment 5¹ (Fig. 1), occupy the upper one is disengaged, but the lower one is driven by means of the worm 31 of the shaft 32. Furthermore a sieve 47 is provided in this compartment.

By controlling the valves 13, 12 and 17, 16 and 7 in a suitable manner, washing or fixing may for instance be proceeded with in the various compartments of groups A, B independently from the processes involved in the neighboring compartments. In case it is deemed necessary to change over from washing to fixing in one compartment, it is not necessary to stop the whole plant, only those reels, which are arranged above that compartment, in which the changing over from washing to fixing or from fixing to washing has to take place, have to be disengaged for a certain time. If small posts of fabrics only have to be treated, only few compartments of the group A or B will have to be filled with liquid, in which case less liquid is used than if all the sections of the compartments of a group were in permanent communication with each other.

In the compartments 48, 49, 50 of the plant the fabrics may be washed, fixed, dyed, treated with soap or such like, in the same manner as in the compartments 1, 2, 3, 4, 5, 5¹. As all compartments 48, 49, 50 of a group C are permanently communicating with each other, washing, fixing, coloring or treating with soap may only be executed in all the compartments of such a group C at the same time.

In combination with compartment 48 it is shown how the spokes of fabric reels may be screwed out for the purpose of stretching the skein or the transversely folded skeins. Such a stretched reel is then put on two arms 76 carrying journals which have been swung up for this purpose, in order to be driven with a higher speed by one of the worms 69 of the shaft 33. In this way the fabric on the reel is subjected to a preliminary centrifugal action. A case 77 is always placed over the reel put on the bearing arms 76. It is clear that the fabric previously treated in the compartments 1, 2, 3, 4, 5, 5¹ may also be subjected to a preliminary centrifugal action. In every case skein and transversely folded skeins may also be directly treated in a centrifugal drying apparatus. This preliminary treatment carried out in the manner described has the advantage, that skeins do not need to be folded lengthwise as is the case when put in a centrifugal drying apparatus, thus the formation of holes abrased parts and folds is avoided.

If the fabric on the reels has to be taken off, it is advantageous to bring the reels every time into that position in which the corresponding reels are driven by the shafts 32, 33 or the upper reel is disengaged and the lower one is driven by the shaft 32, a board for taking up the silk is then placed across the upper edge of the compartment of the groups A, B or C, above which said reel is arranged.

Instead of providing two groups A and B and two groups C of compartments, only one group of each kind of groups might be used. Each group A may consist of more or less than six compartments and each group C of more or less than three compartments.

Eccentric rolls of glass, porcelain or such like may be used instead of the reels.

The slide-blocks 19, 20 appertaining to the reels of one compartment of the groups A, B may be coupled together by means of a rod 85 (Figs. 15, 16) provided with a slot and a pin 86 fixed to the lower slide-block in a removable manner, in such a way, that the coupled slide-block 19 is made to follow automatically the lifting of the first slide-block 20 after the latter has been raised a certain amount (as shown in Figs. 15, 16).

What I claim now as my invention is:

1. A plant for the treatment of silk and the like fabric pieces, comprising a plurality of separable compartments, adjustable means for suspending the separation between adjacent compartments, conduits for supplying liquids of different qualities to said compartments, controlling members provided in connection with said conduits for controlling at any moment the liquid just required for the treatment of the fabric piece in that compartment, and means provided in connection with every one of said compartments for guiding the fabric pieces to be treated in the liquid contained in the compartments.

2. A plant for the treatment of silk and the like fabric pieces, comprising compartments combined to groups for the reception of liquids, adjustable means for suspending the separation between adjacent compartments of the same group, conduits for supplying liquids of different qualities to said compartments, controlling members provided in connection with said conduits for controlling the liquid just required for the treatment of the fabric piece in that compartment, and means provided in connection with every one of said compartments for guiding the fabric pieces to be treated in the liquid contained in said compartments.

3. A plant for the treatment of silk and the like fabric pieces, comprising compartments for the reception of liquids combined in groups, adjustable means for suspending the separation between adjacent compartments of the same group, main conduits for supplying liquids of different qualities, shutting off means arranged in said mains, branch-pipes connecting each main with the different compartments of each group, shutting off means arranged in said branch pipes for controlling the flow of liquids to the compartments, and means provided in connection with each of said compartments for guiding the fabric pieces to be treated in the liquid contained in the compartments.

4. A plant for the treatment of silk and the like fabric pieces, comprising compartments for the reception of liquids combined in groups, adjustable means for suspending the separation between adjacent compartments of the same group, a conduit for supplying fresh water, a valve inserted in said conduit, spraying pipes connected to the fresh water conduit and extending in groups into the various compartments, means for controlling the flow of water from said conduit to the spraying pipes, an additional conduit for supplying a chemical liquid, a valve inserted into the latter conduit, a system of pipes branching off from said additional conduit and each leading to one of said compartments, valves inserted in the last mentioned pipes, and means provided in connection with each of said compartments for guiding the fabric pieces to be treated in the liquid contained in the compartments.

5. A plant for the treatment of silk and the like fabric pieces, comprising compartments for the reception of liquids combined in groups, adjustable means for suspending the separation between adjacent compartments of the same group, a fresh water conduit, a valve inserted in said conduit, spraying pipes arranged at different heights, and connected to the fresh water conduit and extended in groups into the various compartments, means for controlling the flow of water from said conduit to the spraying pipes, an additional conduit for supplying a chemical fluid, a valve inserted in the latter conduit, a system of pipes branching off from said additional conduit and each leading to one of said compartments, valves inserted in the last mentioned pipes, and means provided in connection with each of said compartments for guiding the fabric pieces to be treated in the liquid contained in the compartments.

6. A plant for the treatment of silk and the like fabric pieces, comprising a plurality of separable compartments, adjustable means for suspending the separation of the compartments, conduits for supplying liquids of different qualities to said compartments, controlling members provided in connection with said conduits for feeding every compartment at any moment with the liquid just required for the treatment of the fabric piece in that compartment, members for guiding the fabric pieces to be treated in the liquid of the compartments, two of said members placed vertically one above another being provided in connection with each compartment, and means for imparting a rotary motion to said guide members.

7. A plant for the treatment of silk and the like fabric pieces, comprising a plurality of separable compartments, adjustable means for suspending the separation between adjacent compartments, conduits for supplying liquids of different qualities to said compartments, controlling members provided in connection with said conduits for controlling at any moment the liquid required for the treatment of the fabric piece in that compartment, members for guiding the fabric pieces to be treated in the liquid of the compartments, each two of such members provided in connection with each compartment being arranged vertically one above another and being adjustable in a vertical direction, shafts arranged vertically above each other and above said compartments, means for imparting a rotary motion to said shafts, and means for transmitting the rotary motion of said shafts to the guide members when the latter have been brought into determinate positions relatively to the shafts.

8. A plant for the treatment of silk and the like fabric pieces, comprising a plurality of separable compartments, adjustable means for suspending the separation between adjacent compartments, conduits for supplying liquids of different qualities to said compartments, controlling members provided in connection with said conduits for controlling at any moment the liquid required for the treatment of the fabric piece in that compartment, reels with adjustable arms for guiding the fabrics to be treated in the liquid of the compartments, two of said reels being provided in connection with each compartment and the reels of each such pair being arranged one above another and adjustable in a vertical direction, and means adapted to rotate said reels when they have been adjusted at certain heights.

9. A plant for the treatment of silk and the like fabric pieces, comprising a plurality of separable compartments, adjustable means for suspending the separation between adjacent compartments, conduits for supplying liquids of different qualities to said compartments, controlling members provided in connection with said conduits for controlling at any moment the liquid required for the treatment of the fabric piece in that compartment, reels with adjustable arms for guiding the fabrics to be treated in the liquid of the compartment, two of said reels being provided in connection with each compartment and the reels of each such pair being arranged one above another and adjustable in a vertical direction, three shafts arranged above each other, means to rotate said shafts, and means allowing each of the two reels of every compartment to be driven by one of said three shafts when it assumes a determined position and by a second one of said shafts, arranged adjacent to the first mentioned one of the three shafts, when said reel assumes a second determined position.

10. In a plant for the treatment of silk and similar material which comprises a group of communicating compartments, a vertically adjustable reel for each compartment, means for rotating the reels, a removable guide roller for each compartment for guiding the material to be passed through a compartment, said roller being adjustable as to height.

11. In a plant for the treatment of silk and similar material a group of communicating compartments, a vertically adjustable reel for each compartment, means at different elevations for driving said reels when brought into driving relation thereto, and high speed driving means actuated from one of the aforesaid driving means for said reels and a guide roller adjustable as to height for guiding the material as it is passed through a compartment.

12. In a plant for the treatment of silk and similar material, comprising communicating compartments, guide means for guiding the material through a compartment, driving means for said members for driving at different speeds, hinged arms on opposite side of the compartments when in their upturned position for supporting said members when driven at high speed.

13. In a plant for the treatment of silk and similar material a group of communicating liquid containing compartments, vertically movable reels for said compartments means for driving said reels at different elevations, a pump, a reservoir, a sump, said reservoir, pump, and sump in relation to said group and each other that liquid contained in said group may be pumped either directly to the reservoir or from the sump in to the reservoir, and hinged arms on opposite sides of said compartments to support said reels when driven at high speed at the low level.

In testimony that I claim the foregoing as my invention, I have signed my name.

FRIEDRICH JOHANN BAPTIST KNIBIEHLER.